(12) United States Patent
Watanabe et al.

(10) Patent No.: US 7,854,056 B2
(45) Date of Patent: Dec. 21, 2010

(54) PRODUCTION METHOD OF A ROTOR

(75) Inventors: Atsushi Watanabe, Toyota (JP);
Kenichiro Fukumaru, Nishikamo-gun (JP); Kentaro Haruno, Toyota (JP); Taketo Takeuchi, Nishio (JP); Katsumi Amano, Kitakyushu (JP); Kazutoshi Ueda, Kitakyushu (JP); Takashi Fukumoto, Kitakyushu (JP)

(73) Assignees: Toyota Jidosha Kabushiki Kaisha, Toyota-shi (JP); Mitsui High-Tec, Inc., Kitakyushu-shi (JP)

( * ) Notice: Subject to any disclaimer, the term of this patent is extended or adjusted under 35 U.S.C. 154(b) by 276 days.

(21) Appl. No.: 11/991,085

(22) PCT Filed: Aug. 28, 2006

(86) PCT No.: PCT/JP2006/317387

§ 371 (c)(1), (2), (4) Date: Apr. 8, 2008

(87) PCT Pub. No.: WO2007/026900

PCT Pub. Date: Mar. 8, 2007

(65) Prior Publication Data

US 2009/0174273 A1    Jul. 9, 2009

(30) Foreign Application Priority Data

Sep. 1, 2005    (JP) ............... 2005-253411

(51) Int. Cl.
*H02K 15/02* (2006.01)
(52) U.S. Cl. ............... 29/598; 29/596; 29/732
(58) Field of Classification Search ........... 29/596–598, 29/732; 310/49.12, 64, 257, 237; 264/272.2, 264/263, 269, 273
See application file for complete search history.

(56) References Cited

U.S. PATENT DOCUMENTS 5,199,171 A * 4/1993 Umezawa et al. ........ 29/898.07
5,806,169 A * 9/1998 Trago et al. ................. 29/596

FOREIGN PATENT DOCUMENTS

JP    59-035555 A    2/1984
JP    05-083892 A    4/1993

(Continued)

*Primary Examiner*—Minh Trinh
(74) *Attorney, Agent, or Firm*—Kenyon & Kenyon LLP

(57) ABSTRACT

The present invention has an object to propose a method of producing a rotor, capable of reliably fixing a magnet to a rotor core with resin and preventing breakage of the rotor core. The present invention includes a step of fixing a permanent magnet to a rotor core by injecting molten resin into a slot by injection molding on the condition that, assuming that: a dimension between an end surface of the rotor core and an end surface of the permanent magnet is a core end surface-magnet interval; and a minimum value of a dimension between an inner surface of the slot and a side surface of the permanent magnet, allowing the molten resin to fully fill a clearance between the inner surface of the slot and the side surface of the permanent magnet by injecting the resin into the slot through a cylinder, is a minimum slot-magnet interval value, and a value of the core end surface-magnet interval is equal to or larger than the minimum slot-magnet interval value.

2 Claims, 8 Drawing Sheets

FOREIGN PATENT DOCUMENTS

| | | | | |
|---|---|---|---|---|
| JP | 405111225 A * | 4/1993 | ................. | 29/596 |
| JP | 05-191936 | 7/1993 | | |
| JP | 08-088963 A | 4/1996 | | |
| JP | 10-327547 A | 12/1998 | | |
| JP | 2001-157394 A | 6/2001 | | |
| JP | 2001-298887 A | 10/2001 | | |

* cited by examiner

FIG. 3
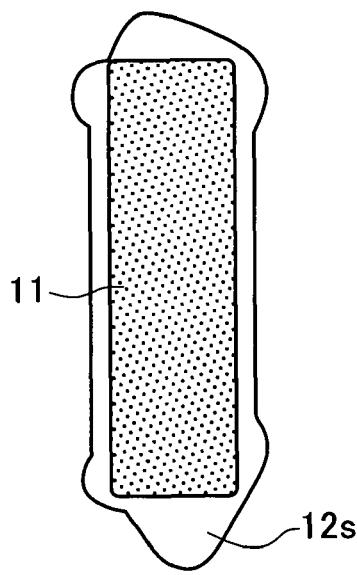
FIG. 4
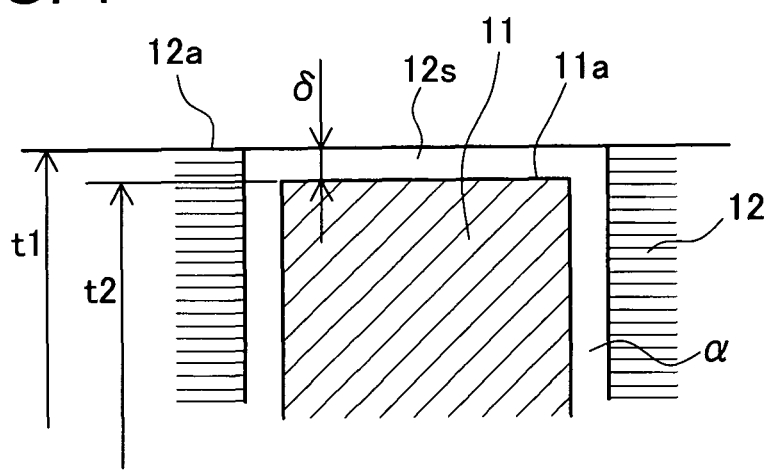
FIG. 5
| DISTANCE OF CLEARANCE FILLING LENGTH | 50 μm | 100 μm | 150 μm |
|---|---|---|---|
| SPEC.1 | × | × | ○ |
| SPEC.2 | × | × | ○ |

PRODUCTION METHOD OF A ROTOR

This is a 371 national phase application of PCT/JP2006/317387 filed 28 Aug. 2006, claiming priority to Japanese Patent Application No. 2005-253411 filed 1 Sep. 2005, the contents of which are incorporated herein by reference.

TECHNICAL FIELD

The present invention relates to a method of producing a rotor to be used in a motor, including a step of fixing a magnet to a rotor core with resin, and relates to the rotor.

BACKGROUND ART

For fixing a magnet to a rotor core of a rotor to be used in a motor, there is a method of fixing the magnet to the rotor core with resin. As one prior art, there is the invention of Patent Document 1 mentioned below.

FIG. 10 is an external perspective view of a rotor 101 disclosed in Patent Document 1. FIG. 11 is an exploded perspective view of the rotor 101 disclosed in Patent Document 1 in which resin 113 has not been injected yet. As shown in FIGS. 10 and 11, the rotor 101 is configured such that resin is injected between adjacent permanent magnets 111 to fix the magnets 111 to a rotor core 112.

Patent Document: JP2001-298887A (paragraph [0031], FIGS. 1 and 2)

DISCLOSURE OF INVENTION

Problems to be Solved by the Invention

Here, when a motor including the rotor 101 is activated, rotating the rotor 101, a centrifugal force acts on the permanent magnets 111. Even though both end portions of each permanent magnet 111 in a circumferential direction are fixed with resin, a central portion 111a of each permanent magnet 111 in the circumferential direction is not fixed with resin. Stress by the centrifugal force generated by rotation of the rotor 101 is therefore liable to concentrate on resin portions existing in both end portions of each permanent magnet 111 in the circumferential direction. Accordingly, the magnet 111 is retained insufficiently with resin and thus may come away from the rotor core 102.

There is also a rotor 201 in which permanent magnets 211 are fixed to a rotor core 212 with resin 213 as shown in FIG. 12. FIG. 12 is a sectional view of the hollow cylindrical rotor core 212 constituted of laminated electromagnetic steel sheets, viewed in a radial direction thereof. As shown in FIG. 12, the rotor core 212 is provided with a plurality of slots 212s which are through holes arranged at predetermined circumferential intervals, in each of which the permanent magnets 211 are inserted. In those slots 212s, the permanent magnets 211 are fixed with resin 213.

However, if it is insufficient to control the amount of resin 213 to be filled in a clearance between the inner surface of the slot 212s and the side surfaces of the permanent magnets 211 on the outer peripheral side in the stator core 212, as indicated by a region A in FIG. 12, some portions unfilled with resin 213 may be formed and the filling amount of resin 213 may become different by site, and so on. In those cases, by the centrifugal force caused by the rotation of the rotor 201, the stress would concentrate on a portion unfilled with resin 213 and a portion filled with only a small amount of resin 213. When the stress concentration due to the centrifugal force locally acts as above, the rotor core 212 constituted of laminated steel sheets may be broken.

Therefore, the object of the present invention is to provide a method of producing a rotor, capable of reliably fixing a rotor core to a magnet with resin to prevent breakage of the rotor core.

Means for Solving the Problems

To achieve the above purpose, the present invention exhibits the following characteristics.

(1) A rotor production method of the present invention is characterized in a method of producing a rotor, comprising: a hollow cylindrical rotor core constituted of laminated electromagnetic steel sheets; a slot that is a hole axially formed through the rotor core and arranged near a peripheral edge of the rotor core; a magnet placed in the slot; an upper die placed on a first end surface of the rotor core and provided with a cylinder through which molten resin is to be injected; and a lower die placed on a second end surface of the rotor core for pressurizing the rotor core in cooperation with the upper die, and the method including a step of fixing the magnet to the rotor core by injecting the molten resin into the slot by injection molding, wherein the method includes the step of fixing the magnet to the rotor core by injecting the molten resin into the slot by injection molding on condition, assuming that a dimension between the first end surface of the rotor core and an end surface of the magnet is a core end surface-magnet interval, and a minimum value of a dimension between an inner surface of the slot and a side surface of the magnet, allowing the molten resin to fully fill between the inner surface of the slot and the side surface of the magnet up to a portion of the slot next to the lower die by injecting the resin into the slot through the cylinder of the upper die, is a minimum slot-magnet interval value, and a value of the core end surface-magnet interval is larger than the minimum slot-magnet interval value.

(2) The rotor production method of the present invention is characterized in that, in the method of producing rotor set forth in (1), the step of fixing the magnet to the rotor core by injecting the molten resin in the slot by injection molding is conducted on condition that the value of the core end surface-magnet interval is a value in the injection molding in which the rotor core is pressurized by the upper die and the lower die and the molten resin is injected into the slot.

ADVANTAGES OF THE INVENTION

The invention having the above characteristics can provide the following operations and advantages.

(1) The present invention provides a method of producing a rotor, comprising: a hollow cylindrical rotor core constituted of laminated electromagnetic steel sheets; a slot that is a hole axially formed through the rotor core and arranged near a peripheral edge of the rotor core; a magnet placed in the slot; an upper die placed on a first end surface of the rotor core and provided with a cylinder through which molten resin is to be injected; and a lower die placed on a second end surface of the rotor core for pressurizing the rotor core in cooperation with the upper die, and the method including a step of fixing the magnet to the rotor core by injecting the molten resin into the slot by injection molding, wherein the method includes the step of fixing the magnet to the rotor core by injecting the molten resin into the slot by injection molding on condition, assuming that a dimension between the first end surface of the rotor core and an end surface of the magnet is a core end surface-magnet interval, and a minimum value of a dimension between an inner surface of the slot and a side surface of the magnet, allowing the molten resin to fully fill between the inner surface of the slot and the side surface of the magnet up to a portion of the slot next to the lower die by injecting the resin into the slot through the cylinder of the upper die, is a minimum slot-magnet interval value, and a value of the core end surface-magnet interval is larger than the minimum slot-magnet interval value. Accordingly, the rotor production method can be achieved so that a sufficient filling amount of the resin can be applied in an entire clearance between the inner surface of the slot and the side surface of the permanent magnet, thereby enabling reliable fixing of the permanent magnet to the rotor core by resin molding, and nonuniform stress concentration due to centrifugal force can be avoided, thus preventing breakage of the rotor core.

(2) In the method of producing rotor set forth in (1), the step of fixing the magnet to the rotor core by injecting the molten resin in the slot by injection molding is conducted on condition that the value of the core end surface-magnet interval is a value in the injection molding in which the rotor core is pressurized by the upper die and the lower die and the molten resin is injected into the slot. Accordingly, the rotor production method can be achieved so that, in addition to the advantages mentioned in (1), the sufficient filling amount of the resin can be applied in the entire clearance between the inner surface of the slot and the side surface of the magnet even when the value of the core end surface-magnet interval varies in the injection molding of the resin. Thus, the permanent magnet can be fixed to the rotor core by the resin molding with more reliability, and nonuniform stress concentration due to centrifugal force can be avoided, thereby preventing breakage of the rotor core.

BRIEF DESCRIPTION OF DRAWINGS

FIG. 3 is a view taken in a direction of an arrow A in FIG. 2;

FIG. 4 is a view showing a setting condition of each dimension;

FIG. 5 is a table showing an experimental result about a relationship between the axial filling height of a clearance part forming a clearance allowing resin to flow therein and the dimension of the clearance allowing resin to flow therein;

EXPLANATION OF REFERENCE CODES

11 Permanent magnet
12 Rotor core
12s Slot
13 Resin
21 Upper die
22 Lower die
23 Cylinder
24 Plunger
25 Communication path
δ Core end surface-magnet interval
α Slot-magnet interval

BEST MODE FOR CARRYING OUT THE INVENTION

Figure 1:
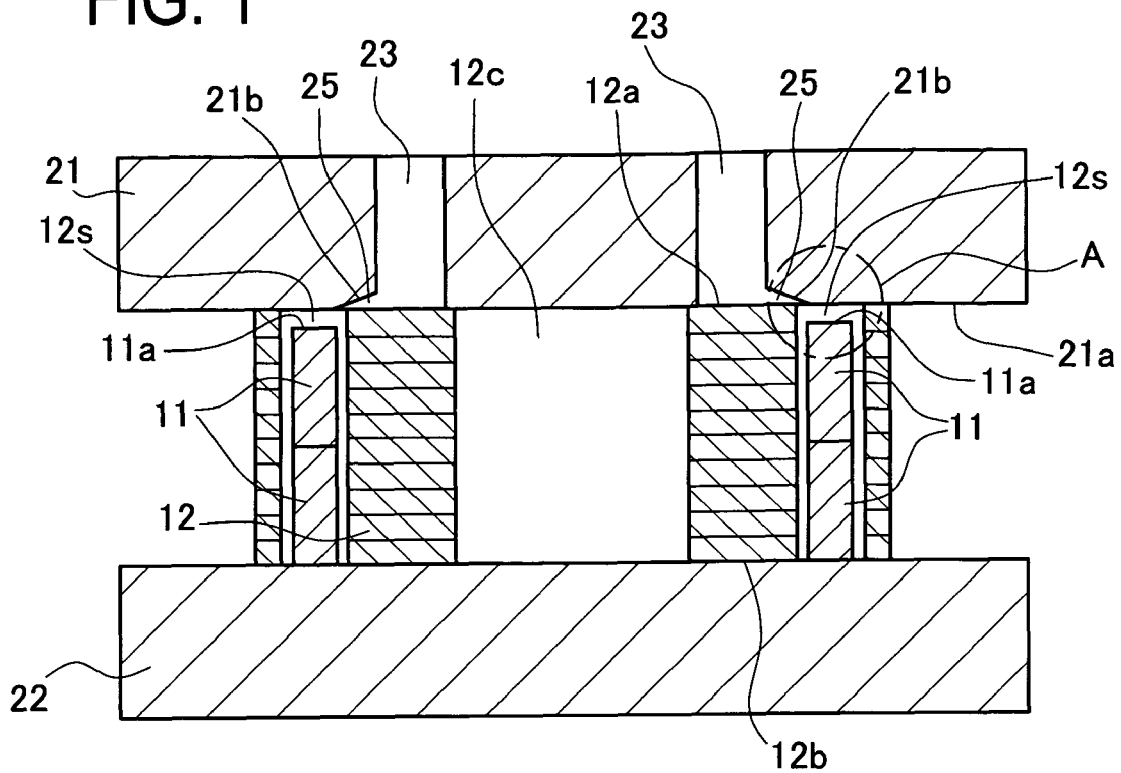
FIG. 1 is a sectional view of a resin molding structure.
Figure 2:
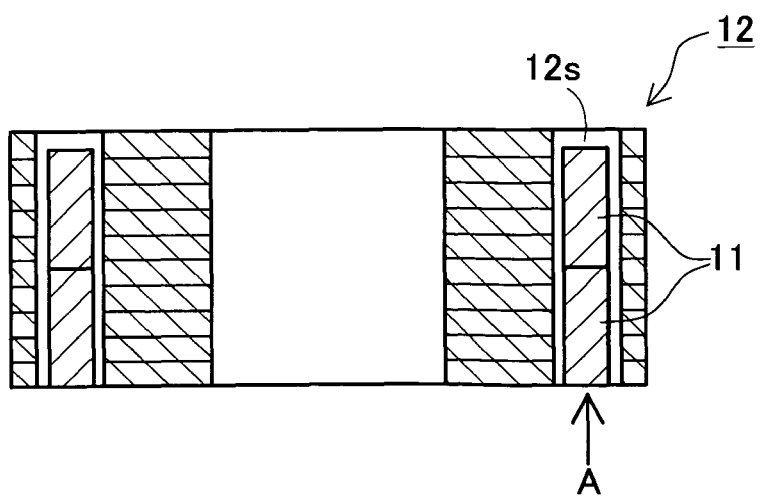
FIG. 2 is a sectional view of a rotor core viewed in a radial direction.
Figure 6:
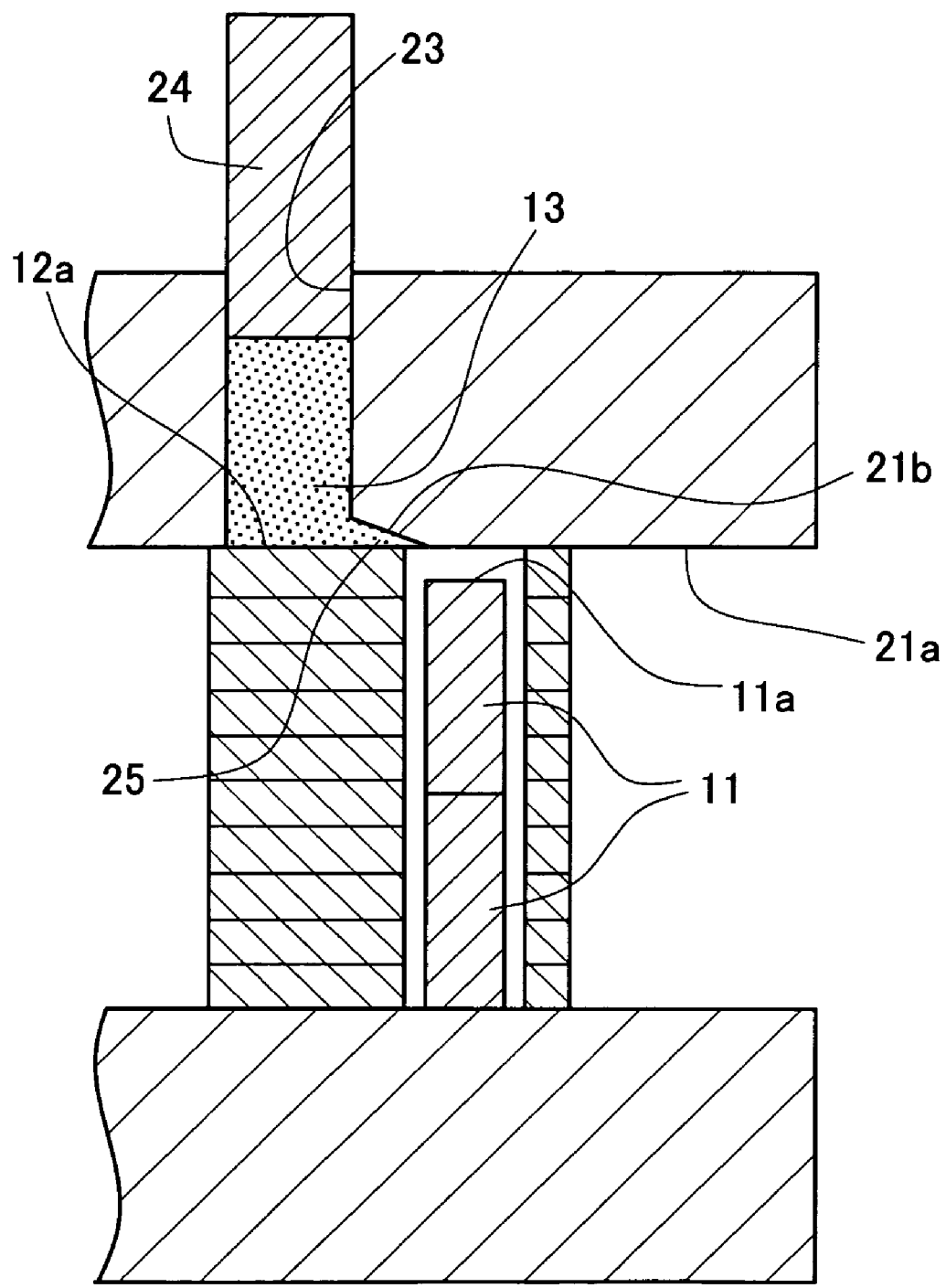
FIG. 6 is a sectional view of the resin molding structure in which resin flows in a communication path.
Figure 7:
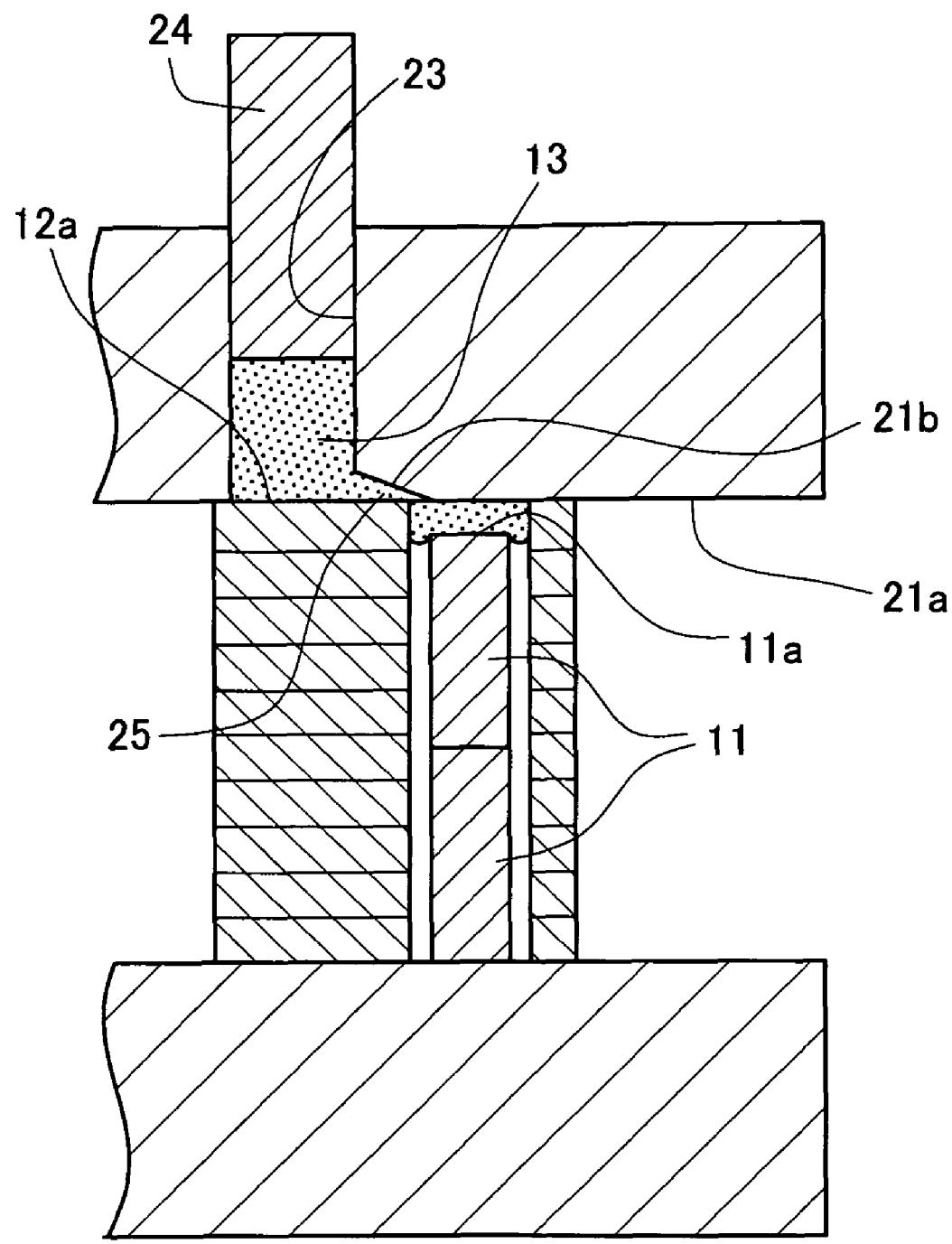
FIG. 7 is a sectional view of the resin molding structure in which resin flows in between an end surface of the rotor core and an end surface of a permanent magnet.
Figure 8:
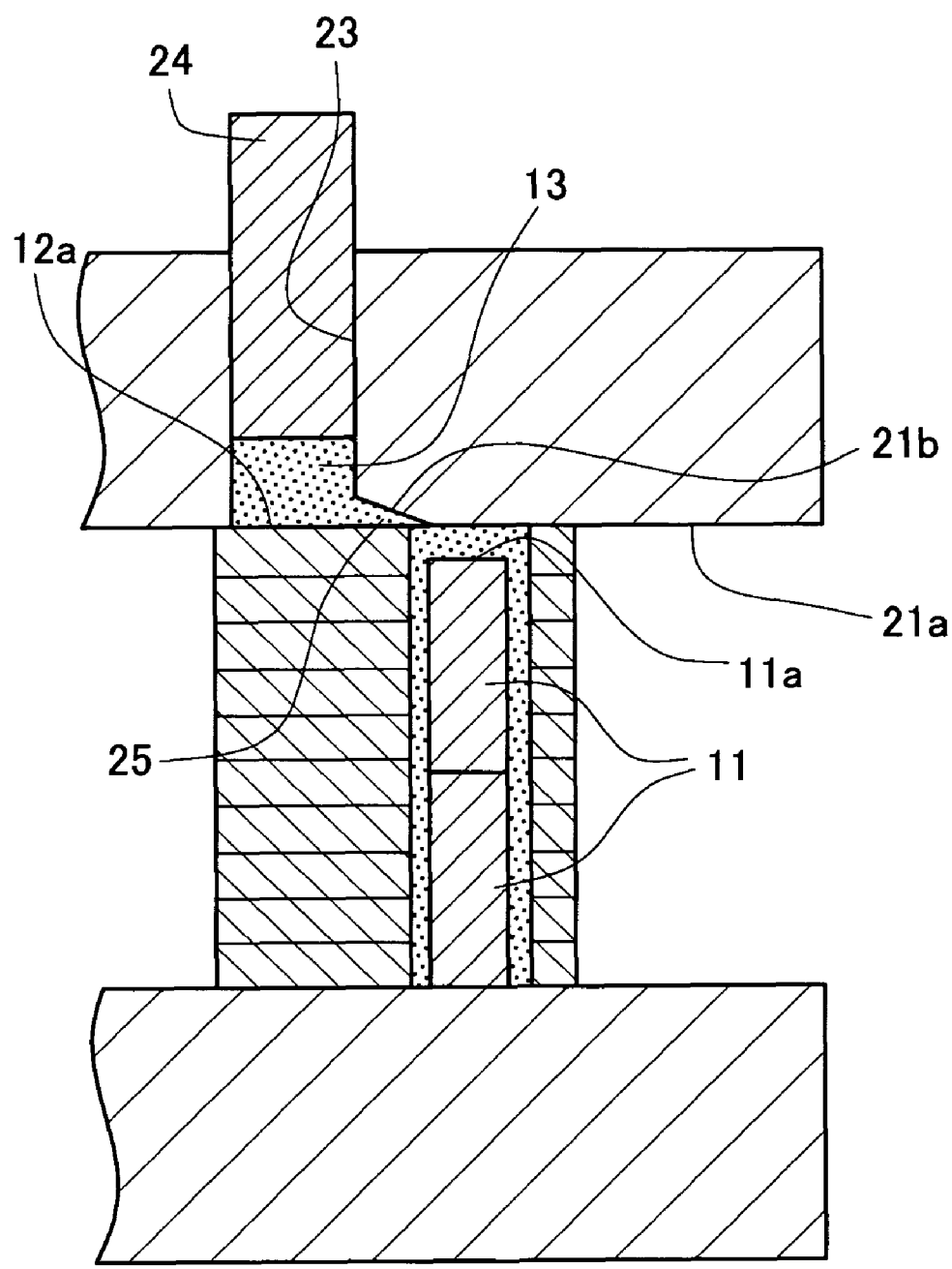
FIG. 8 is a sectional view of the resin molded structure in which resin flows in between an inner surface of a slot and an outer peripheral surface of a permanent magnet.
Figure 9:
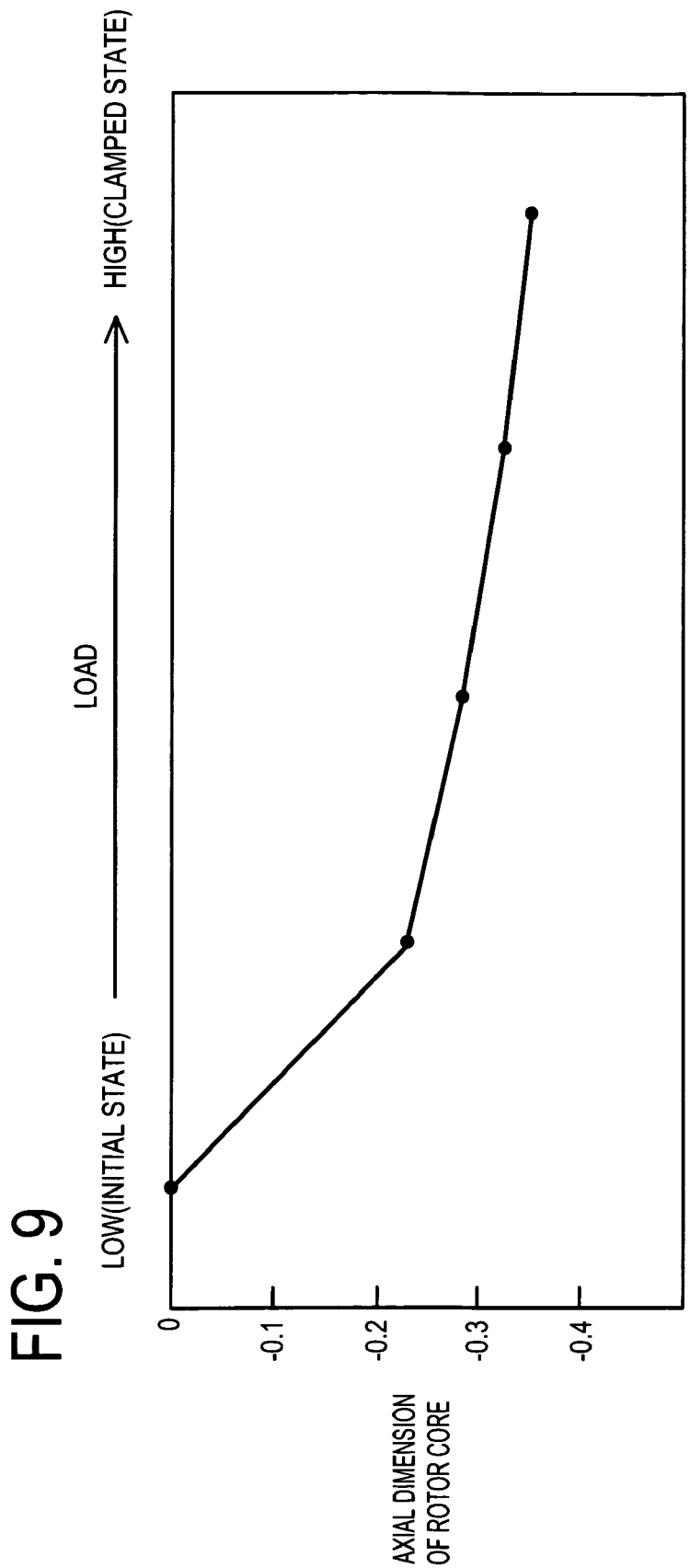
FIG. 9 is a graph showing a relationship between clamping load and axial dimension of a rotor.
Figure 10:
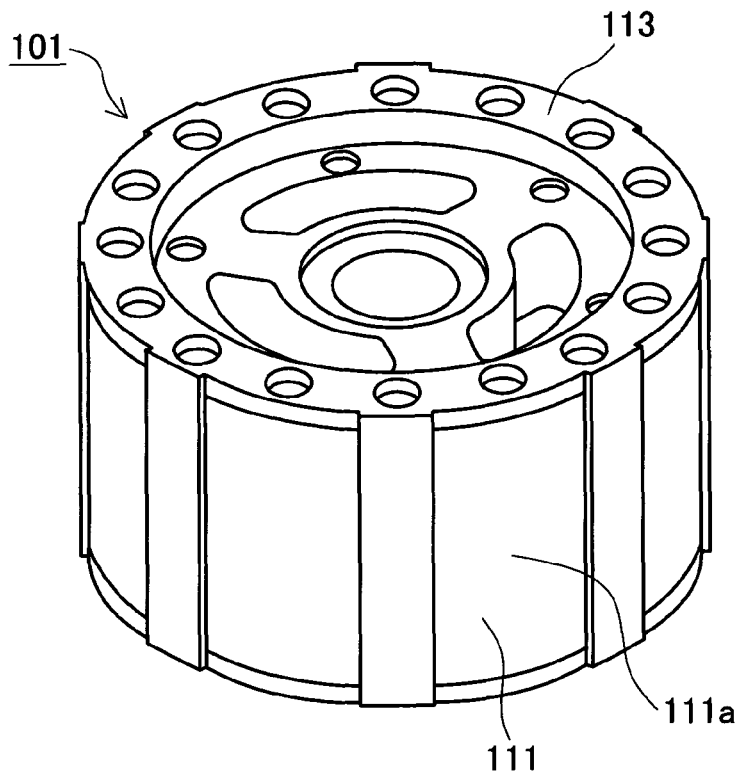
FIG. 10 is an external perspective view of a rotor disclosed in Patent Document 1.
Figure 11:
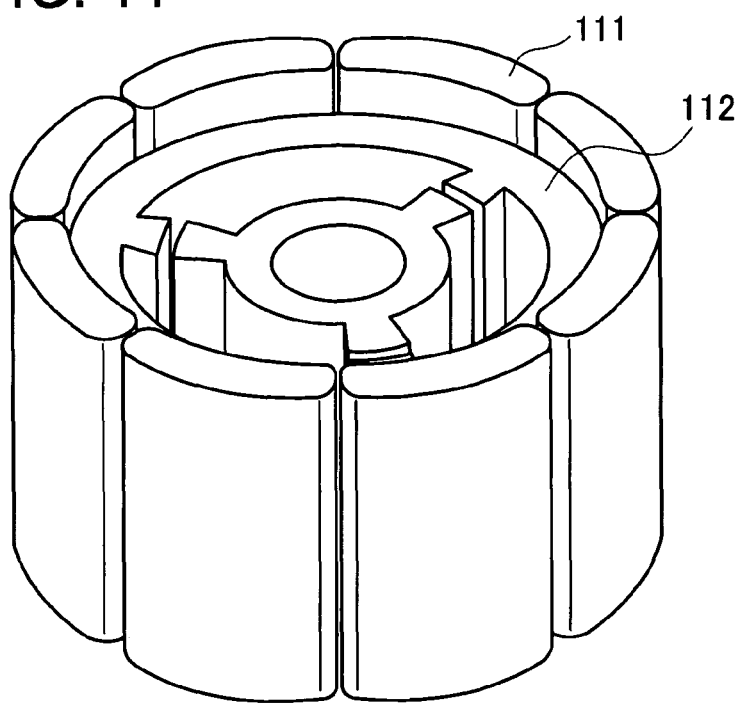
FIG. 11 is an exploded perspective view of the rotor disclosed in Patent Document 1, the resin being not injected yet.
Figure 12:
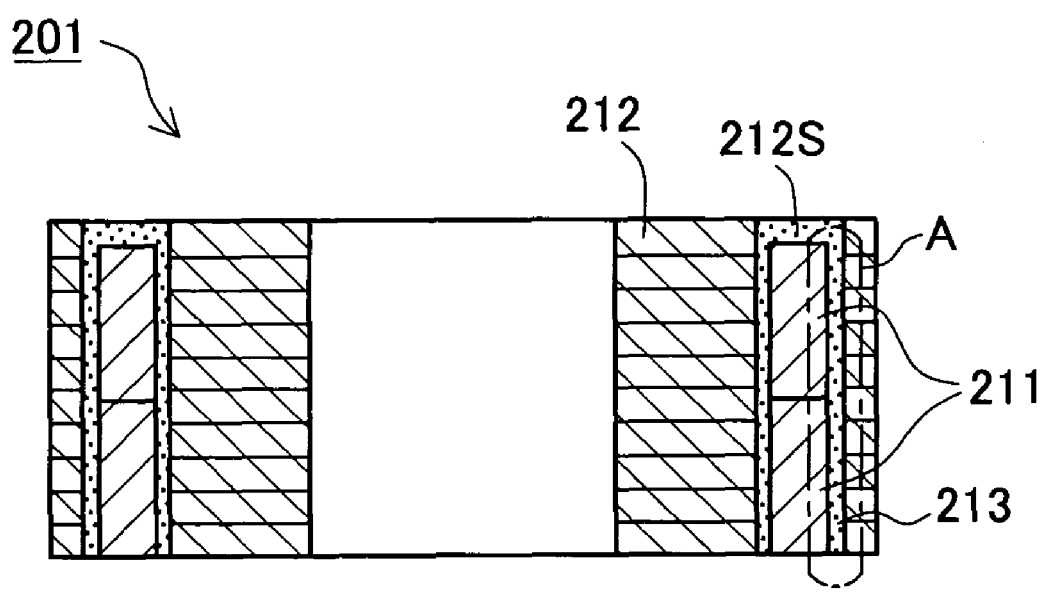
FIG. 12 is a sectional view of a general rotor with a permanent magnet fixed in a slot with resin.

A preferred embodiment of the invention will be described below. FIG. 1 is a sectional view showing a resin molding structure for fixing a magnet to a rotor core with resin. FIG. 2 is a sectional view of only a rotor core 12 viewed in a radial direction. FIG. 3 is a view taken in a direction of an arrow A in FIG. 2, showing a positional relation of a slot 12s and a permanent magnet 11 viewed in an axial direction of the rotor core 12. FIGS. 6 to 8 are sectional views showing a right half of FIG. 1, showing a flowing state of resin 13.

As shown in FIG. 1, the resin molding structure includes permanent magnets 11, the rotor core 12, an upper die 21 and a lower die 22, and others. The rotor core 12 is a hollow cylindrical shape formed of a number of electromagnetic steel sheets and has an end surface 12a on the side facing the upper die 21, an end surface 12b on the side facing the lower die 22, and a hollow part 12c. Further, a plurality of slots 12s is arranged at equal angular intervals (at predetermined circumferential pitches) near a peripheral edge of the rotor core 12. In each slot 12s, as shown in FIG. 1, a pair of the plate-shaped permanent magnets 11 magnetized in its thickness direction is vertically stacked one on the other in the axial direction of the rotor core 12. Each permanent magnet 11 is a sintered magnet such as a ferrite magnet. When viewed in the axial direction of the rotor core 12, the permanent magnet 11 is positioned in the slot 12s as shown in FIG. 3.

As shown in FIG. 1, furthermore, the upper die 21 and the lower die 22 which are of a disc shape are placed on both ends of the rotor core 12 in the axial direction. The upper die 21 is provided with a lower surface 21a which will contact with the end surface 12a of the rotor core 12 and a plurality of cylinders 23 arranged in the circumferential direction. Each cylinder 23 is formed to receive a plunger 24 mentioned later. The upper die 21 is further provided with a cylinder lower surface 21b in a communication area 25 between each cylinder 23 and the slot 12s of the rotor core 12. Each cylinder 23 is arranged in a position between the hollow part 12c and the slot(s) 12s of the rotor core 12 in its radial direction when the upper die 21 and the lower die 22 are mounted on both ends of the rotor core 12 in the axial direction.

In the above structure, the resin 13 is injected in each cylinder 23 of the upper die 21 and increased in temperature to be softened. The molten resin 13 is then pressed by the plunger 24 to flow toward the inside of the rotor core 12. The resin 13 used herein is for example epoxy resin superior in strength such as vibration resistance to rotation of a rotor. Thus, the resin 13 is caused to flow in each communication area 25 between the cylinder lower surfaces 21b of the upper die 21 and the end surface 12a of the rotor core 12 on the side facing the upper die 21 and further flow into each slot 12s in which the permanent magnets 11 are placed. The resin 13 then flows in between the end surface 12a of the rotor core 12 and the end surface 11a of the permanent magnet 11 placed on the side facing the upper die 21 as shown in FIG. 7 and continuously flows in between the inner surface of each slot 12s and the side surface of each permanent magnet 11 as shown in FIG. 8. Thereafter, the resin 13 is cooled and solidified, fixing the permanent magnets 11 to the rotor core 12.

Here, a study is made on a relationship between a distance of clearance between the end surface 12a of the rotor core 12 and the end surface 11a of the permanent magnet 11 (a first clearance distance) and a distance of clearance between the inner surface of each slot 12s and the side surface of each permanent magnet 11 located closer to the outer peripheral side of the rotor core 12 (a second clearance distance). When the first clearance distance is smaller than the second clearance distance, filling pressure of the resin 13 may be insufficient for distributing the resin 13 in the entire clearance between the inner surface of each slot 12s and the side surface of each permanent magnet 11. In the case where the resin 13 could not be distributed sufficiently in the entire clearance between the inner surface of each slot 12s and the side surface of each permanent magnet 11 as above, a void portion unfilled with the resin 13 may be formed in the clearance between the inner surface of each slot 12s and the side surface of each permanent magnet 11 and the filling amount of resin 13 may vary by site even in the portion filled with the resin 13.

Between the inner surface of each slot 12s and the side surface of each permanent magnet 11, if the portion unfilled with the resin 13 exists in particularly the clearance closer to the outer peripheral side of the rotor core 12 or the filling amount of the resin 13 is different by site even in the portion filled with the resin 13, when the rotor rotates, generating a centrifugal force in each permanent magnet 11 which acts on the rotor core 12, stress is liable to locally concentrate on the rotor core 12. This may cause breakage of the rotor core 12. Accordingly, it is essential to sufficiently distribute the resin 13 in the entire clearance between the inner surface of each slot 12s and the side surface of each permanent magnet 11 to positively fix the permanent magnets 11 to the rotor core 12.

The present invention therefore proposes a conditional expression to be established between the dimensions of the portions in which the resin 13 will flow, in order to reliably fix the permanent magnets 11 to the rotor core 12. FIG. 4 is an enlarged view of a region A indicated by a circle in FIG. 1. As to a clearance a defined between the inner surface of each slot 12s and the side surface of each permanent magnet 11 and located closer to the outer peripheral side of the rotor core 12 as shown in FIG. 4, the applicant experimentally verified a clearance distance allowing the resin 13 to be fully filled in the entire clearance. Specifically, the filling pressure of the resin 13 in a resin molding process during manufacture of a rotor was reproduced and it was checked whether or not the resin 13 could be filled in the entire clearance a when the distance of the clearance a was set at 50 μm, 100 μm, and 150 μm respectively. As to the filling length, two models were set and verified; one was an arbitral reference dimension (Spec 1: about 135 mm) of the rotor core 12 in the axial direction and the other was a smaller dimension (Spec 2: about 70 mm) than the reference dimension.

As a result of verification, it was found that the resin 13 was hardly filled in the clearance α when the distance of the clearance α was set at 50 μm. This seems to be caused by the flowability of resin 13 which is epoxy resin. That is, the resin 13 is hard to flow in the clearance α having a distance of 50 μm. When the distance of the clearance α was set at 100 μm, a portion unfilled with the resin 13 was formed in the clearance α and also the filling amount of the resin 13 was non-uniform even in a portion filled with the resin 13. On the other hand, when the distance of the clearance a was set at 150 μm, any portion unfilled with the resin 13 was not formed and also the resin 13 was filled in the entire clearance α with a uniform filling amount. The above verification result is shown in FIG. 5. In FIG. 5, the case where the resin 13 could be filled in the entire clearance α is marked with "O" and the case where the resin 13 could not be filled sufficiently in the clearance α is marked with "X".

As shown in FIG. 5, to distribute the resin 13 uniformly in the entire clearance between the inner surface of each slot 12s and the side surfaces of the permanent magnets 11 in order to reliably fix the permanent magnets 11 to the rotor core 12, a minimum value of the distance of the clearance α is preferably 150 μm in consideration of dimensional accuracy of the rotor core 12 and the permanent magnets 11 and the flowability of the resin 13 (epoxy resin).

As shown in FIG. 4, the dimension between the end surface 12a of the rotor core 12 and the end surface 11a of the permanent magnet 11 is assumed to be a core end surface-magnet interval δ. Accordingly, for a relationship between the core end surface-magnet interval δ and a minimum value of the distance of the clearance α (a minimum slot-magnet interval value), a conditional expression is set to establish the following numerical expression.

(Core end surface-magnet interval δ)≧(Minimum slot-magnet interval value)　　Numerical expression 1

By the conditional expression shown by the numerical expression 1, the clearance distance between the end surface 12a of the rotor core 12 and the end surface 11a of the permanent magnet 11 is set to be equal to or larger than the minimum value of the clearance distance for sufficiently distributing the resin 13 in the entire clearance α which is a clearance defined between the inner surface of the slot 12s and the side surface of each permanent magnet 11 and located closer to the outer peripheral side of the rotor core 12. This makes it possible to ensure filling pressure enough to flow the resin 13 in the clearance between the inner surface 12s and the side surface of each permanent magnet 11. Also, the resin 13 can be distributed sufficiently and uniformly in the entire clearance between the inner surface of the slot 12s and the side surface of each permanent magnet 11, thereby reliably fixing the permanent magnets 11 to the rotor core 12. Accordingly, when the centrifugal force is generated in the permanent magnets 11 by rotation of the rotor, the centrifugal force uniformly acts on the rotor core 12, thus preventing breakage of the rotor core 12.

Here, when the rotor core 12 is clamped by the upper die 21 and the lower die 22 with very high load to make a resin molding process for supplying the resin 13 into the each slot 12s, a value of the core end surface-magnet interval δ will vary for the reason mentioned below.

In the resin molding process for supplying the resin 13 into each slot 12s, the resin 13 is increased in temperature to be softened and thus the resin 13 is in a high temperature state. The rotor core 12 which is exposed to the resin 13 will thermally expand due to its material that is electromagnetic steel sheets, thus extending the dimension of the rotor core 12 in the axial direction. Further, each permanent magnet 11 which is similarly exposed to the resin 13 will constrict because the magnet 11 is a sintered magnet. As a result of the resin molding process for supplying the resin 13 into each slot 12s, the value of the core end surface-magnet interval δ which is a dimension between the end surface 12a of the rotor core 12 and the end surface 11a of the permanent magnet 11 will vary.

In the resin molding process for supplying the resin 13 into each slot 12s, furthermore, the clamping has to be conducted in such a manner that the upper die 21 and the lower die 22 are attached to both end surfaces of the rotor core 12 in the axial direction. At that time, very high load is required for the clamping for the following reason. The resin 13 supplied through each cylinder 23 will pass through the communication path 25 formed between the cylinder lower surface 21b of the upper die 21 and the end surface 12a of the rotor core 12 and then flow in each slot 12s of the rotor core 12. If the clamping load is insufficient, the resin 13 is likely to leak from the communication path 25 into a gap between the lower surface 21a of the upper die 21 and the end surface 12a of the rotor core 12, with the result that the amount of the resin 13 flowing in each slot 12s may be insufficient. In the case where the filling amount of the resin 13 in each slot 12s is insufficient, the resin 13 could not be filled sufficiently in the clearance between the inner surface of the slot 12s and the side surfaces of the permanent magnets 11, resulting in generation of a portion unfilled with the resin 13. Thus, the permanent magnets 11 cannot be reliably fixed to the rotor core 12. Consequently, to clamp the rotor core 12 by the upper die 21 and the lower die 22 attached to both end surfaces of the rotor core 12 in its axial direction, very high load is required. As one example for reference, in the case of an arbitral reference dimension (Spec 1: about 135 mm) of the rotor core 12 in the axial direction, a load of about 6 tons is applied.

When the rotor core 12 is clamped with very high load by the upper die 21 and the lower die 22 as above, the rotor core 12 constituted of a number of laminated electromagnetic steel sheets will constrict in thickness in the axial direction of the rotor core 12 due to its elasticity. Accordingly, clamping the rotor core 12 by the upper core 21 and the lower core 22 also will cause a change in the value of the core end surface-magnet interval δ which is a dimension between the end surface 12a of the rotor core 12 and the end surface 11a of the permanent magnet 11.

For reference, one example is shown about a change in the value of the core end surface-magnet interval δ caused in the resin molding process under an arbitral condition and a change in the value of the core end surface-magnet interval δ caused by the clamping of the rotor core 12 by the upper die 21 and the lower die 22. The change in the value of the core end surface-magnet interval δ in the resin molding is first explained blow. The permanent magnet 11 has a larger coefficient of thermal expansion of material than the rotor core 12. The axial dimension of the rotor core 12 at a normal temperature of 25° C. is assumed to be an arbitral reference dimension. When the temperature of the resin 13 is increased to 165° C., the core end surface-magnet interval δ finally increases by about 250 μm.

The change in the value of the core end surface-magnet interval δ by the clamping of the rotor core 12 by the upper die 21 and the lower die 22 is as follows.

To show the relationship between the clamping load of the rotor core 12 by the upper die 21 and the lower die 22 and the axial dimension of the rotor core 12 assumed to be an arbitral reference dimension, FIG. 6 indicates the clamping load by the upper die 21 and the lower die 22 as a horizontal axis and the axial dimension of the rotor core 12 (assuming the reference dimension to be zero) as a vertical axis. As shown in FIG. 6, by the load applied in a clamped state of the rotor core 12 by the upper die 21 and the lower die 22, the axial dimension of the rotor core 12 constricts by about 400 μm as compared with in an initial state, so that the value of the core end surface-magnet interval δ decreases by about 400 μm.

The above example is a mere reference. Under different conditions, similarly, the change in the value of the core end surface-magnet interval δ caused by the clamping of the rotor core 12 by the upper die 21 and the lower die 22 will be generally larger than the change in the value of the core end surface-magnet interval δ caused by the resin molding. Thus, when the rotor core 12 is clamped with very high load by the upper die 21 and the lower die 22 and the resin 13 is supplied in each slot 12s for resin molding, the value of the core end surface-magnet interval δ will decreases. In the above example assuming the axial dimension of the rotor core 12 as the arbitral reference dimension, the value of the core end surface-magnet interval δ is considered to decrease by about 150 μm.

If a decrease in the value of the core end surface-magnet interval δ results in that the clearance distance between the end surface 12a of the rotor core 12 and the end surface 11a of the permanent magnet 11 becomes smaller than the minimum value of distance of the clearance α, the filling pressure to flow the resin 13 in the clearance between the inner surface of each slot 12s and the side surface of each permanent magnet 11 cannot be sufficiently obtained, which may cause insufficient distribution of the resin 13.

In the case where the resin 13 is not sufficiently distributed in the clearance between the inner surface of each slot 12s and the side surface of each permanent magnet 11, a portion unfilled with the resin 13 is likely to be formed between the inner surface of each slot 12s and the side surface of each permanent magnet 11. Thus, each permanent magnet 11 could not be fixed to the rotor core 12 with reliability.

The present invention therefore proposes that a conditional expression to be established between the dimensions of the portions in which the resin 13 will flow, in order to reliably fix the permanent magnets 11 to the rotor core 12. Specifically, as shown in FIG. 4, it is assumed that the axial dimension (thickness) of the rotor core 12 clamped by the upper die 21 and the lower die 22 in the resin molding process is t1 and the axial dimension (thickness) of the permanent magnets 11 in the resin molding process is t2.

A conditional expression is set to establish the following numerical expression in addition to the numerical expression 1.

(Core end surface-magnet interval δ)=(Axial dimension t1 of rotor core 12 clamped by upper die 21 and lower die 22 in resin molding)−(Axial dimension t2 of permanent magnets 11 in resin molding)　　Numerical expression 2

In this numerical expression 2, the core end surface-magnet interval δ is set at a value calculated by subtracting the magnet dimension t2 in the resin molding from the core dimension t1 in the clamped state by the upper die 21 and the lower die 22 in the resin molding. Therefore, even when the core end surface-magnet interval δ is decreased to a minimum value because of the clamping by the upper die 21 and the lower die 22 in the resin molding, it is possible to provide the filling pressure enough to flow the resin 13 in the clearance between the inner surface of each slot 12s and the side surface of each permanent magnet 11 defined as the slot-magnet interval α.

Accordingly, the resin 13 can be filled sufficiently in the clearance between the inner surface of each slot 12s and the side surface of each permanent magnet 11, thereby reliably fixing each permanent magnet 11 to the rotor core 12 with the resin 13. Thus, when the centrifugal force is generated in the permanent magnets 11 by rotation of the rotor, the centrifugal force of the permanent magnets 11 uniformly acts on the rotor core 12, and thus breakage of the rotor core 12 can be prevented.

The above embodiment can provide the following advantages.

(1) The present invention can achieve the method of producing a rotor including a step of fixing the permanent magnets 11 to the rotor core 12 by injecting the molten resin 13 into the slots 12s by injection molding, in which there are provided the hollow cylindrical rotor core 12 constituted of laminated electromagnetic steel sheets; the slots 12s each being a hole formed through the rotor core 12 in the axial direction near the peripheral edge of the rotor core 12; the permanent magnets 11 inserted in the corresponding slots 12s; the upper die 21 placed on the end surface 12a of the rotor core 12 and provided with the cylinders 23 through which the resin 13 is injected; and the lower die 22 placed on the end surface 12b of the rotor core 12 for pressuring the rotor core 12 in cooperation with the upper die 21. The method comprises the step of fixing the permanent magnets 11 to the rotor core 12 by injecting the molten resin 13 into each slot 12s by injection molding on condition, assuming that: the dimension between the end surface 12a of the rotor core 12 and the end surface 11a of the permanent magnet 11 is the core end surface-magnet interval δ; and a minimum value of a dimension between the inner surface of the slot 12s and the side surface of each permanent magnet 11, allowing the molten resin 13 to fully fill between the inner surface of the slot 12s and the side surface of the permanent magnet 11 up to a portion of the slot 12s next to the lower die 22 by injecting the resin 13 into the slot 12s through the cylinder 13 of the upper die 21, is a minimum slot-magnet interval value, and a value of the core end surface-magnet interval 6 is larger than the minimum slot-magnet interval value. Accordingly, the rotor production method can be achieved so that a sufficient filling amount of the resin 13 can be applied in the entire clearance between the inner surface of each slot 12s and the side surface of each permanent magnet 11, thereby enabling reliable fixing of the permanent magnets 11 to the rotor core 12 by resin molding, and nonuniform stress concentration due to centrifugal force can be avoided, preventing breakage of the rotor core 12.

(2) In the rotor production method (1) of the present invention, the step of fixing the permanent magnets 11 to the rotor core 12 by injecting the molten resin 13 in each slot 12s by injection molding is conducted on condition that the value of the core end surface-magnet interval δ is a value determined when the rotor core 12 is pressurized by the upper die 21 and the lower die 22 and the molten resin 13 is injected into each slot 12s to perform injection molding.

Accordingly, in addition to the advantages described in (1), the rotor production method can be achieved so that the sufficient filling amount of the resin 13 can be applied in the entire clearance between the inner surface of each slot 12s and the side surface of each permanent magnet 11 even when the value of the core end surface-magnet interval δ changes in the injection molding of the resin 13, so that the permanent magnet 11 can be fixed to the rotor core 12 by the resin molding with more reliability, and nonuniform stress concentration due to centrifugal force can be avoided, preventing breakage of the rotor core 12.

The present invention is not limited to the above embodiment and may be embodied in other specific forms without departing from the essential characteristics thereof.

The invention claimed is:

1. A method of producing a rotor, comprising:
providing a hollow cylindrical rotor core constituted of laminated electromagnetic steel sheets; a slot that is a hole axially formed through the rotor core and arranged near a peripheral edge of the rotor core; a magnet, having an end surface and a side surface, placed in the slot; an upper die provided with a cylinder through which molten resin is to be injected and placed on a first end surface of the rotor core such that the cylinder communicates with the slot via a communication area between the end of the cylinder and the first end surface of the rotor core; and a lower die placed on a second end surface of the rotor core for pressurizing the rotor core in cooperation with the upper die; and
fixing the magnet to the rotor core by injecting the molten resin into the slot by injection molding,
wherein:
a dimension between the first end surface of the rotor core and the end surface of the magnet is a core end surface-magnet interval, δ,
a dimension between an inner surface of the slot and the side surface of the magnet is a slot-magnet interval, α,
a minimum slot magnet interval value is a minimum value of the slot-magnet intervals of a plurality of verification objects having different slot-magnet intervals, as determined by allowing molten resin to fully fill the space between an inner surface of a test slot of each verification object and a side surface of a test magnet of each verification object up to a portion of the test slot next to a test lower die of each verification object when injecting the resin into the test slot through a test cylinder of an upper die of each verification object, and
a value of the core end surface-magnet interval, δ, is larger than the minimum slot-magnet interval value.

2. The method of producing a rotor, according to claim 1, wherein the step of fixing the magnet to the rotor core by injecting the molten resin in the slot by injection molding is conducted on condition that the value of the core end surface-magnet interval is a value in the injection molding in which the rotor core is pressurized by the upper die and the lower die and the molten resin is injected into the slot.

* * * * *